July 13, 1954
E. W. BAGNELL
2,683,370
PRESSURE RECORDING DEVICE
Filed June 1, 1948
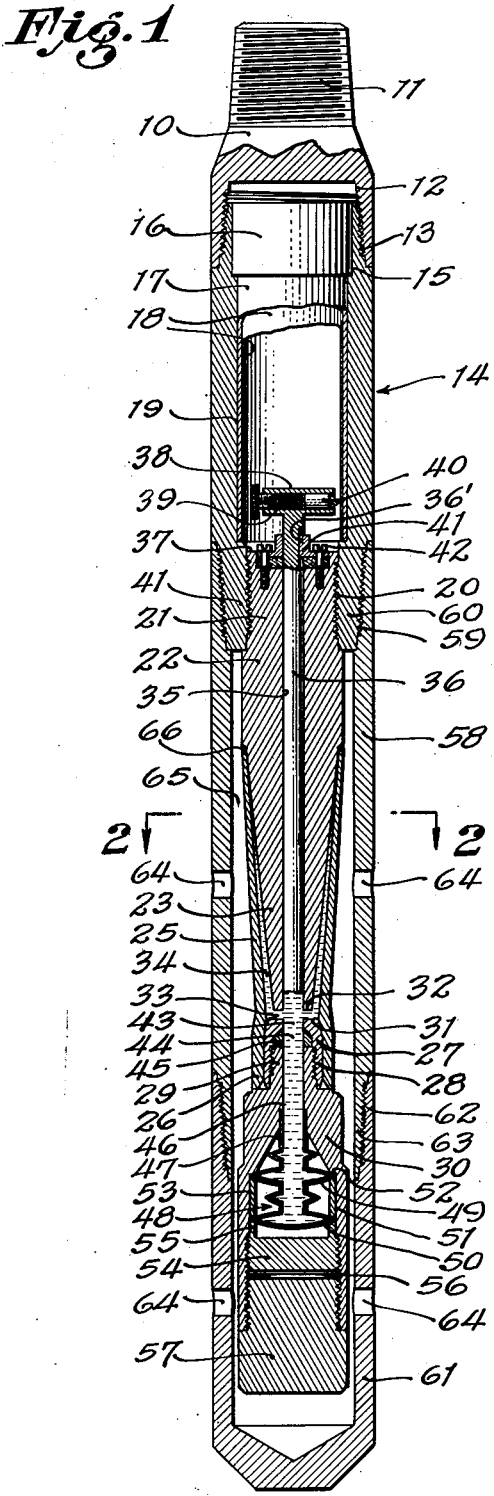
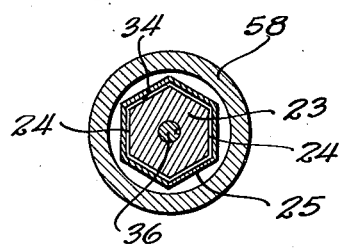
Inventor,
EDGAR W. BAGNELL
By James W. Abbott
Attorney Patented July 13, 1954

2,683,370

UNITED STATES PATENT OFFICE 2,683,370

PRESSURE RECORDING DEVICE

Edgar W. Bagnell, Glendale, Calif., assignor, by mesne assignments, to Johnston Testers, Inc., Houston, Tex., a corporation of Delaware Application June 1, 1948, Serial No. 30,385

14 Claims. (Cl. 73—300)

This invention relates to oil well surveying tools, and particularly pertains to a pressure recording device.

In drilling oil wells it is desirable to ascertain the fluid pressure at the bottom of an oil well and it is common practice to lower a pressure recording device to a zone to be tested and to then seal off the hydrostatic head of fluid above the testing area so that the fluid pressure can be recorded. In this type of instrument it is difficult to provide a structure by which an accurate recording can be made due to the fact that the pressure of the fluid within the well is imposed upon moving elements which require fluid sealing means. In some instances it is necessary to mechanically tighten these sealing means, with the result that movable parts are restrained variably in their action and thus give readings which are not reliable. It is the principal object of the present invention to provide a fluid pressure recording device in which packing elements are not necessary and which will insure consistent accurate recordings at all times.

The present invention contemplates the provision of a constantly driven recording chart over which a stylus passes, and which stylus is actuated uniformly by the pressure of the fluid within which the recording device is submerged, said device including a mandrel over which a deformable sleeve is disposed and between which mandrel and sleeve fluid occurs so that compression of the sleeve will act upon a recording stylus.

The invention is illustrated by way of example in the accompanying drawings in which:

Figure 1 is a view in central longitudinal section showing the pressure recording device with which the present invention is concerned.

Fig. 2 is a view in transverse section as seen on the line 2—2 of Fig. 1, showing the relation of the mandrel and the deformable element of the recording structure.

Referring more particularly to the drawing, 10 indicates a top sub which is threaded at 11 to be connected to a string of drill pipe or to the lower end of a pressure testing tool. The lower end of the sub is formed with an internal bore 12 which is threaded at 13 to receive a housing section 14. The upper end of the housing section 14 is formed with a counterbore 15 within which a suitable clock mechanism 16 is positioned. The clock mechanism 16 is of standard construction and drives a cylindrical tubular chart holder 17. Mounted within the chart holder 17 is a chart sheet 18 upon which a recording may be inscribed. The chart holder 17 is rotatable within a bore 19 of the housing 14. At the lower end of the bore 19 is a threaded section 20 of reduced diameter. The threaded section 20 receives the pin portion 21 of a mandrel 22. The mandrel 22 is formed at its lower end with a tapered portion 23 which is polygonal in cross-section, as shown in Fig. 2, and provides a plurality of flat faces 24 which taper longitudinally of the mandrel portion 23. Mounted over the portion 23 of the mandrel 22 is a deformable sleeve 25. This sleeve is of sectional form to agree with the form of the polygonal portion of the mandrel. The sleeve is also tapered longitudinally from its lower end so that its sides are progressively reduced in diameter toward the upper end of the sleeve. The wall of the sleeve has been tapered longitudinally in cross section so that the response to the pressure of the fluid within which the instrument is suspended will progress in direct proportion to the wall thickness. Thus, when the ambient fluid pressure is relatively small, the thinner tapered wall section is deflected, and as the ambient fluid pressure increases the lower thicker wall section will be flexed. This insures that the instrument will be sensitive and responsive to a wide range of ambient fluid pressures. The lower end of the sleeve 25 is formed with a cylindrical portion 26 which fits over a member 27 which is internally threaded at 28 to receive a threaded pin 29 of a fitting 30. The members 26 and 27 are preferably welded together so that no fluid leak will occur between them. The upper end 31 of the cup 27 is preferably flat and is spaced from the lower end 32 of the mandrel portion 23 so that a fluid space 33 will occur between them. This fluid space will communicate with a fluid space 34 which occurs between the sleeve 25 and the mandrel portion 23.

Formed centrally of the mandrel 22 is a bore 35 which accommodates a piston rod 36. The rod is of a length to extend from a point slightly above the lower end face 32 to a point above the upper end 37 of the mandrel. At its upper end a stylus holder 38 is attached carrying a spring 39 which yieldably urges a stylus 40 outwardly and against the chart 18. The upper end of the piston rod 36 extends through a packing member 41, which member is secured in a counterbore on the pin portion 21 of the mandrel by screws 42. Formed centrally through the cup 27 is a passageway 43 which communicates with a central passageway 44 in a tapered packing seat 45. The packing seat 45 is interposed between the end of the portion 29 of the member 30 and the cup. The member 30 has a central opening 46 which is in alignment with the openings 44 and 35. These openings accommodate a tube 47 which carries a plurality of bellows of the Sylphon type. These bellows are provided for heat compensation of fluid within the instrument and are generally indicated at 48. Certain of the bellows sections are of relatively large diameter, as indicated at 49 and 50. These sections are mounted within a counterbore 51 formed in the lower end of the member 30. The section 49 rests against a shoulder 52 in this counterbore. A spacing collar 53 rests against the opposite side of the section and is interposed between it and the section 50 of the compensating bellows 48. A lock nut 54 is formed with an annular flange 55 to rest against the lower face of the section 50 of the compensating bellows. The nut 54 is externally threaded and is threaded into a bore 56 formed in the lower end of the member 30. A threaded plug 57 is screwed into the lower end of the bore 56 to close the same. The mandrel and compensating structure thus assembled is enclosed within a tubular housing 58 which has a threaded counterbore 59 at its upper end. This counterbore receives the threaded extension 60 of the housing member 14. At the lower end of the housing section 58 a bull-nose 61 is mounted. This is cup-shaped and is internally threaded at 62 to receive the threaded end 63 of the housing section 58. Formed through the side walls of the housing section 58 and the bull-nose 61 are fluid ports 64. These ports permit a free flow of fluid from the well bore to enter the chamber 65 which occurs around the mandrel 22 and the sleeve 25.

When it is desired to operate the pressure recording instrument shown in Figs. 1 and 2 of the drawing the compensating bellows 48 and the tube 47 are filled with an incompressible fluid, which fluid also fills the space 33 between the face of the cup 27 and the end of the mandrel portion 23. This fluid also occupies the space 34 which occurs between the tapered side faces of the mandrel and the walls of the sleeve 25. It is to be understood that the marginal lip of the sleeve 25 is joined to the upper end of the mandrel portion 23 in some permanent manner such as by welding along the area indicated at 66. A chart 18 may then be placed within the chart carrier 17 and the clock 16 may be set in motion. The top sub 10 is then screwed into position so that the instrument may be attached to suitable suspending means. The instrument is then lowered into the well bore and submerged within the well fluid. This fluid will enter the ports 64 and surround the entire lower structure which is enclosed within the housing 58 and the bull-nose 61. The pressure of this fluid will act to collapse the wide wall sections 24 of the sleeve 25. The collapsing action will of course take place progressively from the upper edge of the sleeve due to the fact that the wall sections of the sleeve 25 are then adjacent to the portion 66 and progressively increase in thickness toward the cup 27. As these walls are collapsed the incompressible fluid within the spaces 33 and 34 around the mandrel will be forced from these spaces and into the lower end of the longitudinal bore 35 through the mandrel. This will act to force the piston rod 36 upwardly and to move the stylus 40 along the chart 18. Attention is directed to the fact that the piston rod 36 is splined within the bore 35 by a key 36'. Thus the rod is free to reciprocate within the bore but will be held against rotation so that the stylus will move in a fixed longitudinal path along the chart. At this same time the compensating bellows 48 and the tube 47 will receive the compressed fluid so that pressure of the fluid will be equalized throughout the confined space.

It is to be understood that as the recording instrument is lowered into the well bore it passes into conditions of progressively increasing latent heat. This heat tends normally to cause the confined incompressible fluid to expand, with the result that the recordings of the instrument would become and more inaccurate as the instrument is lowered into the hole. In the present case, however, the heat compensating bellows 48 will tend to expand and will compensate for the increase in volume of the confined fluid so that the stylus will make accurate recordings.

It will thus be seen that the invention here disclosed provides a pressure recording instrument suitable for use in oil wells, and that it is rugged in construction, its parts are not liable to get out of order, and it will indicate the pressure accurately regardless of the magnitude of the pressure of the fluid within which it is submerged and regardless of temperature variations within the fluid.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. An instrument for recording the pressure of a liquid within which the instrument is submerged, which comprises a tubular housing provided with a connection for suspending means at its upper end and being closed at its lower end, there being perforations through the walls of said housing to establish communication with the interior thereof and the fluid body within which the housing is submerged, a clock structure within said housing, a chart carrier driven by the clock structure, a mandrel disposed centrally of the housing and enclosed thereby, and having a longitudinally extending bore therethrough, a stylus piston rod reciprocating in said bore and extending out of the upper end thereof, a stylus carried thereon for contact with the chart mounted within the chart carrier, a resilient cup within which the lower end of the mandrel extends and which is sealed to the mandrel at its upper edge whereby an intermediate pressure chamber will be provided, the lower end of the central bore of the mandrel communicating therewith, a Sylphon bellows structure mounted beneath said cup and communicating with the fluid chamber formed thereby, said Sylphon bellows structure, the fluid chamber formed by the cup, and the lower end of said bore being filled with incompressible fluid, whereby inward flexure of the side walls of the cup toward the side walls of the mandrel as produced by the pressure of the fluid within which the instrument is submerged will force the stylus piston upwardly and appropriately move the stylus over the chart, and whereby the variation in temperature of the fluid will be accommodated by appropriate expansion and contraction of the Sylphon bellows.

2. The structure of claim 1 in which the periphery of said Sylphon bellows is fixed to the housing at a point intermediate its ends.

3. The structure of claim 1 in which the mandrel is polygonal in section and the enclosing wall of the resilient cup conforms substantially to the contour thereof.

4. In a pressure responsive device of the character set forth, a recording chart, a stylus touching the chart and movable with respect thereto, an actuating member for said stylus, a tubular mandrel having a longitudinally extending fluid passage therethrough mounted below said chart, said stylus actuating member being slidably received in one end of said fluid passageway, whereby said member will be moved in response to variations of fluid pressure in said fluid passage, a resilient shell mounted over the lower end of the mandrel and sealed to the mandrel at its upper edge, a fitting closing the lower end of said shell, said mandrel shell and fitting defining a pressure responsive chamber in direct communication with the other end of said fluid passage, a Sylphon bellows temperature responsive chamber connected to said fitting, and a passageway through said fitting providing fluid communication between said pressure responsive chamber and the interior of said Sylphon bellows, whereby the fluid pressure in the pressure responsive chamber will be affected by changes in temperature so that the pressure applied through the first mentioned passage to the actuating member will reflect both the pressure and the temperature at which the device is located.

5. An instrument for recording the pressure of a liquid within which the instrument is submerged which comprises; a tubular housing provided with a connection for suspending means at its upper end and being closed at its lower end, the wall of the housing being formed with perforations to establish communication from the interior of the housing to the fluid body within which the housing is submerged, a clock structure within said housing, a chart carrier driven by the clock structure, a fixed mandrel having a longitudinal bore therethrough, a stylus piston rod reciprocating in the said bore and extending out of the upper end thereof, a stylus carried thereon for contact with a chart mounted in the chart carrier, and a resilient shell mounted over the lower end of the mandrel and sealed to the mandrel at its upper edge, the lower end of said shell being closed to form an intermediate sealed compartment around the fixed mandrel containing an incompressible fluid, the shell wall being longitudinally tapered and reduced in wall thickness toward the upper end which is sealed around the mandrel whereby the shell wall will progress in flexibility toward its upper end.

6. The structure of claim 5 in which the outer surface of the fixed mandrel is longitudinally tapered and reduced in cross section toward its lower end and the inner face of the wall of the shell is tapered and spaced from the tapered outer facing of the mandrel to provide a sealed fluid space between the mandrel and the shell which progressively decreases in sectional area from the lower end of the mandrel to the point of connection between the mandrel and the shell and within which space an incompressible fluid is placed.

7. A pressure recording device adapted to be lowered into a well for measuring the pressure of the fluid therein, comprising a first fluid-tight hollow body having resilient walls, a second fluid-tight hollow body having resilient walls and communicating with the first named hollow body, an incompressible fluid within said bodies, means fixed to and enclosing the second body to prevent it from being subjected to the pressure of the fluid in a well and exposing the first named body so that it is subjected to the pressure of the well fluid, a recording device, and means communicating with the fluid in the bodies for actuating the recording device, said second fluid tight body being operable to change its shape upon a change in temperature of the fluid and thus change its effective volume to compensate for the change in the volume of the fluid due to its change in temperature.

8. A pressure recording device adapted to be lowered into a well for measuring the pressure of the fluid therein comprising a mandrel, a fluid-tight hollow body enclosing one end of the mandrel and having resilient walls spaced from the exterior of the mandrel to allow contraction of the walls toward said mandrel, the walls of said body tapering in thickness along the parts thereof opposite the mandrel so that with progressively increasing pressures the walls progressively deform beginning at the thinner portions and proceeding toward the thicker portions to allow the body to be responsive to a wide range of pressures, an incompressible fluid within said body, a recording device, and means communicating with the fluid in the body for actuating the recording device.

9. A pressure recording device adapted to be lowered into a well for measuring the pressure of the fluid therein comprising a mandrel, a fluid-tight hollow body enclosing one end of the mandrel and having resilient walls spaced from the exterior of the mandrel to allow contraction of the walls toward said mandrel, the walls of said body tapering in thickness along the parts thereof opposite the mandrel to allow the body to be responsive to a wide range of pressures, a second fluid-tight hollow body having resilient walls and communicating with the first named hollow body, an incompressible fluid within said bodies, means carrying said bodies and enclosing said second body to prevent it from being subjected to the pressure of the fluid in a well and exposing the first body so that it will be subjected to the pressure of well fluid, a recording device, and means communicating with the fluid in the bodies for actuating the recording device, said second fluid tight body being operable to change its shape upon a change in temperature of the fluid and thus change its effective volume to compensate for the change in the volume of the fluid due to its change in temperature.

10. A pressure recording device adapted to be lowered into a well for measuring the pressure of the fluid therein comprising a mandrel, a fluid-tight hollow body enclosing one end of the mandrel and having resilient walls disposed closely adjacent but spaced from the exterior of the mandrel to allow contraction of the walls toward the mandrel and said mandrel serving to limit the amount of deflection of the walls, the walls of said body tapering in thickness along the parts thereof opposite the mandrel so that with progressively increasing pressures the walls progressively deform beginning at the thinner portions and proceeding toward the thicker portions to allow the body to be responsive to a wide range of pressures, an incompressible fluid within said body, a recording device, and means communicating with the fluid in the body for actuating the recording device.

11. A pressure recording device adapted to be lowered into a well for measuring the pressure of the fluid therein comprising a mandrel, a fluid-tight hollow body enclosing one end of the mandrel and having resilient walls disposed closely adjacent to but spaced from the exterior of the mandrel to allow contraction of the walls toward said mandrel and said mandrel serving to limit deflection of the walls, the walls of said body tapering in thickness along the parts thereof opposite the mandrel to allow the body to be responsive to a wide range of pressures, a second fluid-tight hollow body having resilient walls and communicating with the first named hollow body, an incompressible fluid within said body, means carrying said bodies and enclosing said second body to prevent it from being subjected to the pressure of the fluid in a well and exposing the first body so that it may be subjected to the pressure of well fluid, a recording device, and means communicating with the fluid in the bodies for actuating the recording device, said second fluid tight body being operable to change its shape upon a change in temperature of the fluid and thus change its effective volume to compensate for the change in the volume of the fluid due to its change in temperature.

12. A pressure recording device adapted to be lowered into a well for measuring the pressure of the fluid therein comprising a first fluid-tight hollow body having resilient walls adapted to be subjected to the pressure of fluid in the well, a second fluid-tight hollow body having rigid walls, a third fluid-tight hollow body having resilient walls and being disposed within the second named fluid-tight body so as to be isolated from the fluid in the well and being expandable and contractible within said second body and communicating with the first named body, and incompressible fluid in said first and third bodies, a recording device, and means communicating with the fluid in the first and third bodies for actuating the recording device.

13. A pressure recording device adapted to be lowered into a well for measuring the pressure of the fluid therein comprising a first fluid-tight hollow body having resilient walls, a second fluid-tight hollow body having walls which are resilient to a degree substantially lesser than the degree of resiliency of the walls of said first named hollow body, said second named body communicating with said first named body, an incompressible fluid within said bodies, means carrying said bodies and enclosing said second body to prevent it from being subjected to the pressure of the fluid in a well and exposing the first body so that it is subjected to the pressure of well fluid, a recording device, and means communicating with the fluid in the bodies for actuating the recording device, said second fluid tight body being operable to change its shape upon a change in temperature of the fluid and thus change its effective volume to compensate for the change in the volume of the fluid due to its change in temperature.

14. A pressure recording device adapted to be lowered into a well for measuring the pressure of the fluid therein comprising a mandrel, a fluid-tight hollow body enclosing one end of the mandrel and having resilient walls disposed closely adjacent to but spaced from the exterior of the mandrel to allow contraction of the walls toward said mandrel and said mandrel serving to limit the amount of deflection of the walls, the walls of said body tapering in thickness along the parts thereof opposite the mandrel to allow the body to be responsive to a wide range of pressures, a second fluid-tight body having walls which are resilient to a degree substantially lesser than the degree of resiliency of the walls of said first named body, said second body communicating with said first body, an incompressible fluid within said body, means carrying said bodies and enclosing said second body to prevent it from being subjected to the pressure of the fluid in a well and exposing the first body so that it may be subjected to the pressures of well fluid, a recording device, and means communicating with the fluid in the bodies for actuating the recording device, said second fluid tight body being operable to change its shape upon a change in temperature of the fluid and thus change its effective volume to compensate for the change in the volume of the fluid due to its change in temperature.

References Cited in the file of this patent

UNITED STATES PATENTS

| Number | Name | Date |
| --- | --- | --- |
| 1,969,141 | McDonald | Aug. 7, 1934 |
| 2,223,786 | Hugel | Dec. 3, 1940 |
| 2,444,358 | Markson et al. | June 29, 1948 |